United States Patent
Purdy et al.

(10) Patent No.: US 11,981,578 B2
(45) Date of Patent: May 14, 2024

(54) INHIBITED HYDROFLUORIC ACID COMPOSITION

(71) Applicant: FLUID ENERGY GROUP LTD., Calgary (CA)

(72) Inventors: Clay Purdy, Medicine Hat (CA); Markus Weissenberger, Calgary (CA); Karl W. Dawson, Calgary (CA); Kyle G. Wynnyk, Calgary (CA)

(73) Assignee: Dorf Ketal Chemicals FZE, Fujairah (AE)

( * ) Notice: Subject to any disclaimer, the term of this patent is extended or adjusted under 35 U.S.C. 154(b) by 0 days.

(21) Appl. No.: 16/839,570

(22) Filed: Apr. 3, 2020

(65) Prior Publication Data
US 2020/0317516 A1    Oct. 8, 2020

(30) Foreign Application Priority Data
Apr. 5, 2019 (CA) .................................. CA 3039238

(51) Int. Cl.
*C01B 7/19* (2006.01)
*C03C 15/02* (2006.01)

(52) U.S. Cl.
CPC .............. *C01B 7/191* (2013.01); *C03C 15/02* (2013.01)

(58) Field of Classification Search
CPC .......... C09K 13/00; C09K 13/08; C09G 1/00; C23F 1/10; H04W 4/80; H04W 12/06; H04W 12/069; C01B 7/191; C03C 15/00; C03C 15/02; G06Q 20/34; G06Q 20/4014; H04L 63/0823; H04L 63/0861

USPC .............................. 252/79.1, 79.2, 79.3, 79.4
See application file for complete search history.

(56) References Cited

U.S. PATENT DOCUMENTS

| | | | | |
|---|---|---|---|---|
| 4,372,938 A * | 2/1983 | Oda | ..................... | C01B 17/4523 423/469 |
| 5,905,063 A * | 5/1999 | Tanabe | ..................... | G03F 7/425 510/176 |
| 8,389,453 B2 | 3/2013 | Thomson | | |
| 10,035,949 B2 | 7/2018 | Gill et al. | | |
| 10,793,812 B2 * | 10/2020 | Moon | .................. | H01L 21/3213 |
| 2007/0099806 A1 * | 5/2007 | Stewart | ................ | C11D 7/3218 510/175 |
| 2007/0108404 A1 * | 5/2007 | Stewart | ............... | C11D 11/0047 252/79.1 |
| 2008/0242574 A1 * | 10/2008 | Rath | ...................... | C11D 7/265 510/176 |
| 2011/0275164 A1 * | 11/2011 | Visintin | ............ | H01L 21/31111 438/4 |
| 2013/0210686 A1 * | 8/2013 | Augsburger | ........... | C09K 8/528 507/267 |

FOREIGN PATENT DOCUMENTS

WO    2016033259 A1    3/2016

OTHER PUBLICATIONS

Ammonium Fluoride | Cameo Chemicals | NOAA (Year: 1999).*
Wikipedia, Formate (Year: 2002).*

* cited by examiner

*Primary Examiner* — Duy Vu N Deo
(74) *Attorney, Agent, or Firm* — Blank Rome LLP (57) ABSTRACT

An inhibited hydrofluoric acid aqueous composition, said composition comprising: hydrofluoric acid in solution; and an alkanolamine; wherein said alkanolamine and hydrofluoric acid are present in a molar ratio of at least 1:1.

9 Claims, 6 Drawing Sheets

INHIBITED HYDROFLUORIC ACID COMPOSITION

CROSS REFERENCE TO RELATED APPLICATION

This application claims the benefit of Canadian Patent Application No. 3,039,238 filed Apr. 5, 2019, the entire contents of which are incorporated herein by reference.

FIELD OF THE INVENTION

The present invention is directed to a novel acid composition for use in various industries, more specifically it is directed to an inhibited hydrofluoric acid (HF) and the use of such in a mud acid.

BACKGROUND OF THE INVENTION

Acids have numerous applications across most industries. The use of acids requires certain safety precautions. All acids are not created equal, some are mundane and are found in almost every household, e.g., vinegar. Other acids are highly controlled to avoid major releases, which can cause serious environmental and human exposure consequences.

Hydrofluoric acid, while not a strong acid, i.e., does not dissociate fully in water, is classified as one of the most dangerous substances used in industry. Even small amounts of dermal exposure can result in organ failure and death.

Hydrofluoric acid is a solution of hydrogen fluoride (HF) and water. It is used in the preparation of almost all fluorine compounds, such as polymers. It is a highly corrosive colourless solution that is capable of dissolving a large number of materials, such as glass (silica) and various metals. Because it is highly reactive to glass and corrosive to various metals, it must be stored in plastic containment vessels or other non-reactive materials. As a gas (fumes), hydrogen fluoride is poisonous and can quickly and irreversibly damage soft tissues such as lungs and the corneas of the eyes. Aqueous hydrofluoric acid is a contact-poison with the potential for deep burns that, although initially painless, result in tissue death. By interfering with the body's calcium metabolism, the concentrated acid may also cause systemic toxicity and eventual cardiac arrest and fatality.

Its widespread use warrants the demand for a safer form of HF to allow handling, storage and transport thereof without the constant major negative risks associated with such, and desirably perhaps a loosening of the handling restrictions/requirements.

Prior art, while abundant in its use of HF for various applications, does not provide any indication of an effective, commercially viable, safe alternative for the handling of HF. One can immediately see the value of a safer to handle composition of HF given the multiple applications in multiple industries.

U.S. Pat. No. 8,389,453 teaches a tetrafluoroboric acid and an organic nitrogenous base, related compounds and compositions, can be used in conjunction with various methods of cleaning and/or the treatment of substrate surfaces. It specifically discloses a method for removing surface contaminants, said method comprising: providing an aqueous composition comprising a compound, said compound the acid-base reaction product of tetrafluoroboric acid and urea, said urea and said tetrafluoroboric acid in a molar ratio of about 1.0 to about 3.0, said urea utilized as a base and dissolved in said composition; and contacting said composition and a surface comprising at least one contaminant thereon.

WO2016033259A1 teaches methods for removing and inhibiting deposits, reducing the pH of aqueous mixtures, and increasing recovery of crude oil from subterranean formations, the methods comprising contacting an acid composition with a liquid that is in contact with a metal surface or with a well or formation. The composition comprises a salt of a nitrogen base having a fluoro-inorganic anion. In particular, these methods are intended for removing deposits and lowering the pH. These methods can be used in steam generators, evaporators, heat exchangers, and the like that use water compositions containing produced water and other water sources in plant unit operations.

U.S. Pat. No. 10,035,949 B2 teaches methods for increasing recovery of crude oil from a subterranean hydrocarbon-containing formation and for removing or inhibiting deposits in a well, the methods comprising contacting an acid composition that comprises a salt of a nitrogen base having a fluoro-inorganic anion with the well or the formation.

Also known is tetrafluoroboric acid with the chemical formula $H_3OBF_4$. It is mainly produced as a precursor to fluoroborate salts. It is a strong acid and quite corrosive as it attacks the skin. It is available commercially as a solution in water and other solvents such as diethyl ether. In oil and gas applications it is considered to be a retarded acid which permits deep penetration into the reservoir before the acid is spent, i.e., fully reacted with the formation. For a solution of tetrafluoroboric acid, at no point in time is there a high amount of free HF, making it less reactive than common mud acids. Because of its long reaction time, tetrafluoroboric acid treatments require longer shut-in times compared to common mud acid or HF treatments making them less attractive due to operational restrictions.

In light of the prior art, there remains a need to produce a more HS&E orientated, technically advanced mud acid system and method of using such. The known uses have undeniable value in various industries but the health and environment risks, and technically negative aspects associated with its use, are many and considerable.

SUMMARY OF THE INVENTION

According to an aspect of the present invention, there is provided an inhibited hydrofluoric acid aqueous composition, said composition comprising:
 hydrofluoric acid in solution; and
 an alkanolamine;
wherein said alkanolamine and hydrofluoric acid are present in a molar ratio of at least 1:1.

According to an aspect of the present invention, there is provided an inhibited hydrofluoric acid aqueous composition, said composition comprising:
 hydrofluoric acid in solution; and
 an alkanolamine;
 wherein said alkanolamine and hydrofluoric acid are present in a molar ratio of at least 1.1:1.

Preferably, the alkanolamine is selected from the group consisting of: monoethanolamine, diethanolamine, triethanolamine, and combinations thereof. According to a preferred embodiment, the alkanolamine is monoethanolamine. According to another preferred embodiment, the alkanolamine is diethanolamine. According to yet another preferred embodiment, the alkanolamine is triethanolamine.

According to an aspect of the present invention, there is provided a method of preparing an inhibited hydrofluoric acid composition, said method comprising the steps of:
  providing a pre-determined amount of hydrofluoric acid;
  providing an alkanolamine;
  adding the alkanolamine into the hydrofluoric acid until the molar ratio of alkanolamine:hydrofluoric acid is at least 1:1.

According to an aspect of the present invention, there is provided a precursor to an acid composition for use in glass etching, said precursor comprising:
  hydrofluoric acid in solution; and
  an alkanolamine;
wherein said alkanolamine and hydrofluoric acid are present in a molar ratio of at least 1:1.

According to an aspect of the present invention, there is provided a method of using a precursor to an acid composition for glass etching, said precursor comprising:
  hydrofluoric acid in solution; and
  an alkanolamine;
wherein said alkanolamine and hydrofluoric acid are present in a molar ratio of at least 1:1, wherein the method comprises the steps of:
  providing a glass surface for etching;
  providing said precursor;
  exposing said precursor to an acid with a pKa of less than 3 sufficient to dissociate an amount of HF required to etch glass;
  applying the precursor-acid composition to said glass surface for a sufficient time period to etch said glass surface.

Preferably, the acid composition is selected from the group consisting of acids having a pKa value of less than 3. Preferably, the acid having a pKa value of less than 3 is selected from the group consisting of: hydrochloric acid, nitric acid, sulfuric acid, modified acids, and organic acids. Preferably, the modified acid is selected from the group consisting of: HCl, MEA-HCl, urea-HCl, methanesulfonic acid, sulfuric acid, sulfamic acid, and lysine-HCl. Urea-HCl may come in various molar ratios of urea to HCl preferably, ratios below 1:1 are desirable. Ratios of 0.8:1 and less urea:HCl are more desirable, ratios of 0.7:1 and less are even more desirable. MEA-HCl may come in various ratios of MEA to HCl preferably, ratios ranging from 1:3 to 1:15 are desirable. Ratios ranging from 1:4 to 1:10 are more desirable. Ratios ranging from 1:5 to 1:9 are even more desirable. Lysine-HCl may come in various ratios of lysine to HCl preferably, ratios ranging from 1:3 to 1:15 are desirable. Ratios ranging from 1:4 to 1:10 are more desirable. Ratios ranging from 1:5.5 to 1:9 are even more desirable.

BRIEF DESCRIPTION OF THE FIGURES

The invention may be more completely understood in consideration of the following description of various embodiments of the invention in connection with the accompanying figures, in which.

DESCRIPTION OF EMBODIMENTS OF THE PRESENT INVENTION

Example 1—Inhibited HF Composition

According to a preferred embodiment of the present invention, inhibited HF can be made by the addition of at least 1 molar equivalent of an alkanolamine, such as monoethanolamine (MEA). Preferably, a safety factor of 10% is used, so 1.1 molar equivalents of MEA are added to 1 mole of HF. The subsequent addition of an acid to the inhibited HF composition restores the inhibited HF's ability to dissolve sand, and it has a similar dissolving power to a regular mud acid.

Preferably, the inhibited HF is understood to eliminate the fatal skin contact hazard, however, 5.7% of the MEA remains unreacted, resulting in a solution that is pH 11.5 to 12, and may still carry some skin irritation issues.

Preferably, an inhibited acid should be effective at dissolving metal oxides (especially aluminum oxide) as well as complex silicates. Other desirable properties include: the ability to rapidly solubilize iron oxides and calcium based scales.

Inhibition of HF

Figure 1:
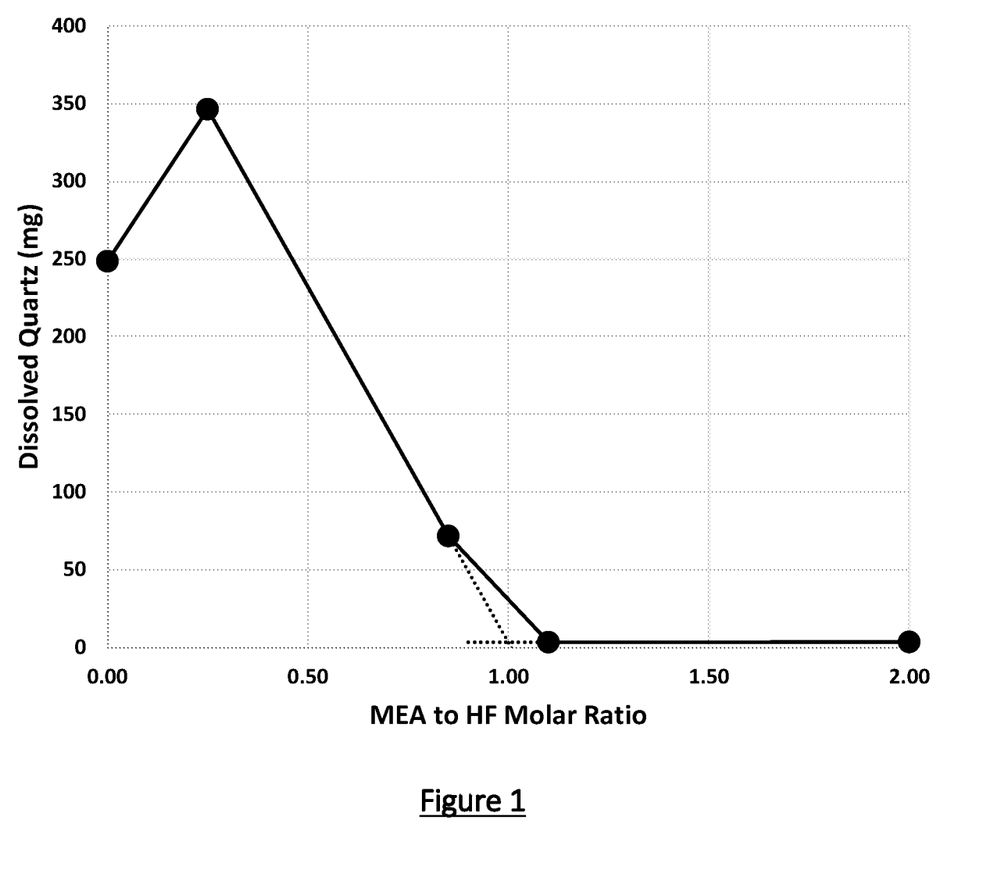
FIG. 1 is a graph depicting the dissolved Quartz after 4 Hours of Reaction Time at 75° C. for Various MEA/HF Ratios.

HF was inhibited by the addition of monoethanolamine (MEA), until no quartz ($SiO_2$) was dissolved, as shown in FIG. 1. A molar ratio of 1 MEA to HF or greater is necessary to inhibit HF's ability to dissolve quartz, and a ratio of 1.1 will used in further testing to provide a reasonable safety margin.

It is assumed that at a ratio of 1.1, the hazard for skin contact of the solution has been eliminated. Although, the excess MEA (5.7%) present may also still be somewhat damaging to the skin as the pH is still relatively high (11.5 to 12).

Re-Activation of the Inhibited HF Composition

Figure 2:
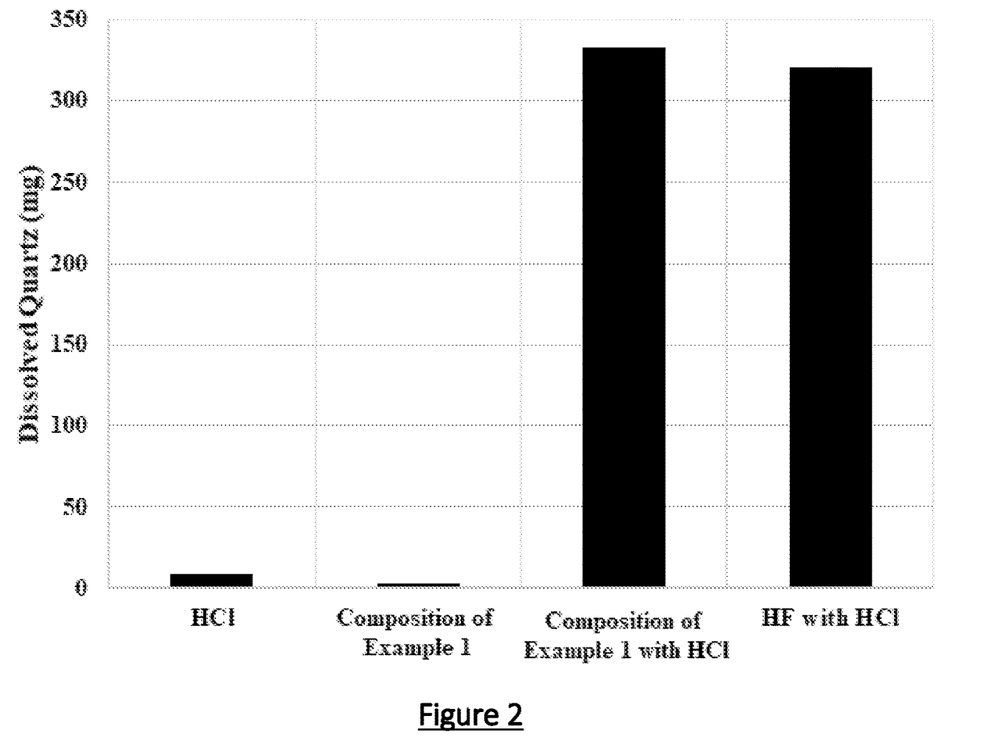
FIG. 2 is a graph showing the comparison of the Quartz Dissolving Ability of Various Acid Solutions 4 Hours Reaction Time at 75° C.
Figure 3:
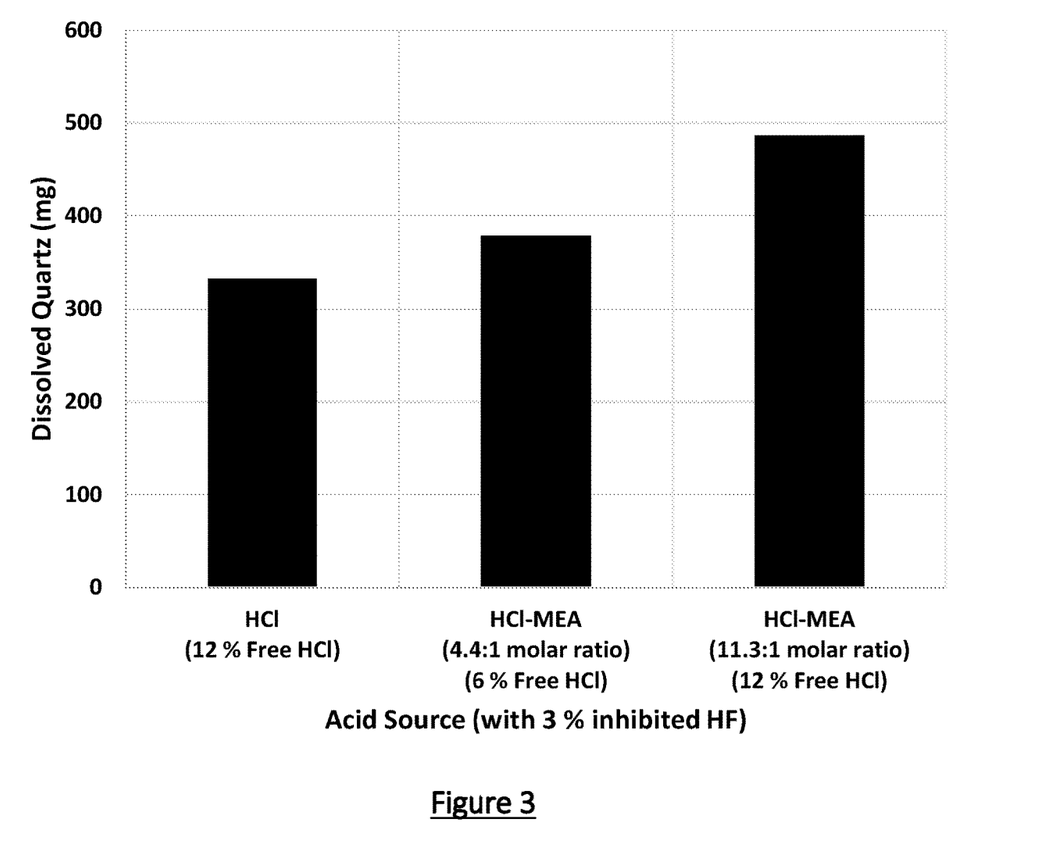
FIG. 3 is a graph showing the comparison of the Quartz Dissolving Ability of 3% HF Mud Acids with Various HCl Sources 4 Hours Reaction Time at 75° C.

The inhibited HF solution can regain its quartz dissolving potential through the addition of an acidic solution, such as HCl, as shown in FIG. 2. By themselves, HCl or inhibited HF dissolve essentially no quartz; however, in combination they perform on par with a normal mud acid (HF:HCl).

To evaluate the performance of mud acids created with acid compositions comprising HCl:MEA in ratios of 4.4:1; 6.3:1; and 11.3:1, inhibited HF mud acids were prepared using HCl and acid compositions comprising HCl:MEA in ratios of 4.4:1; and 11.3:1 with various amount of free HCl (6 to 12%). The results show that mud acids produced with acid compositions comprising HCl:MEA in ratios of 4.3:1; and 11.3:1 match, and may even exceed, the performance of a standard HCl mud acid.

Effects of Mud Acid Compositions Comprising HCl:MEA in Ratios of 4.4:1; 6.3:1; and 11.3:1 on Reprecipitation Three types of reprecipitation products are commonly known to occur during sandstone acidizing, and are referred to as primary, secondary, and tertiary reaction products.

Primary precipitation products can occur between HF and calcium (from $CaCO_3$) to produce calcium fluoride as per equation (1):

$$2HF_{(aq)} + CaCO_3(s) \rightarrow CaF_2(s) + CO_2(g) + H_2O(l) \quad (1)$$

The precipitation will occur when the concentration of $CaF_2$ exceeds 0.16 g/L. This reaction is avoided by using an acidic pre-flush to clean the near-wellbore region, and the inhibited HF combined with HCl for example, will not prevent this reaction if calcium is present.

Secondary precipitation products are those that occur as a result of a reaction with hexafluorosilicic acid ($H_2SiF_6$), which is produced when HF reacts with quartz as shown in equation 2, or with clay (general formula of Al—Si) as shown in equation 4:

$$6HF(aq) + SiO_2(s) \rightarrow H_2SiF_6(aq) + 2H_2O(l) \quad (2)$$

$$(6+x)HF(aq) + Al—Si(s) \rightarrow H_2SiF_6(aq) + AlF_x^{(3-x)+}(aq) \quad (3)$$

Hexafluorosilicic acid can react with alkali metals ($M^+$), typically sodium or potassium, to produce hexafluorosilicate precipitates as per equation 4:

$$H_2SiF_6(aq) + 2\,M^+(aq) \rightarrow M_2SiF_6(s) + 2H^+(aq) \quad (4)$$

Figure 4:
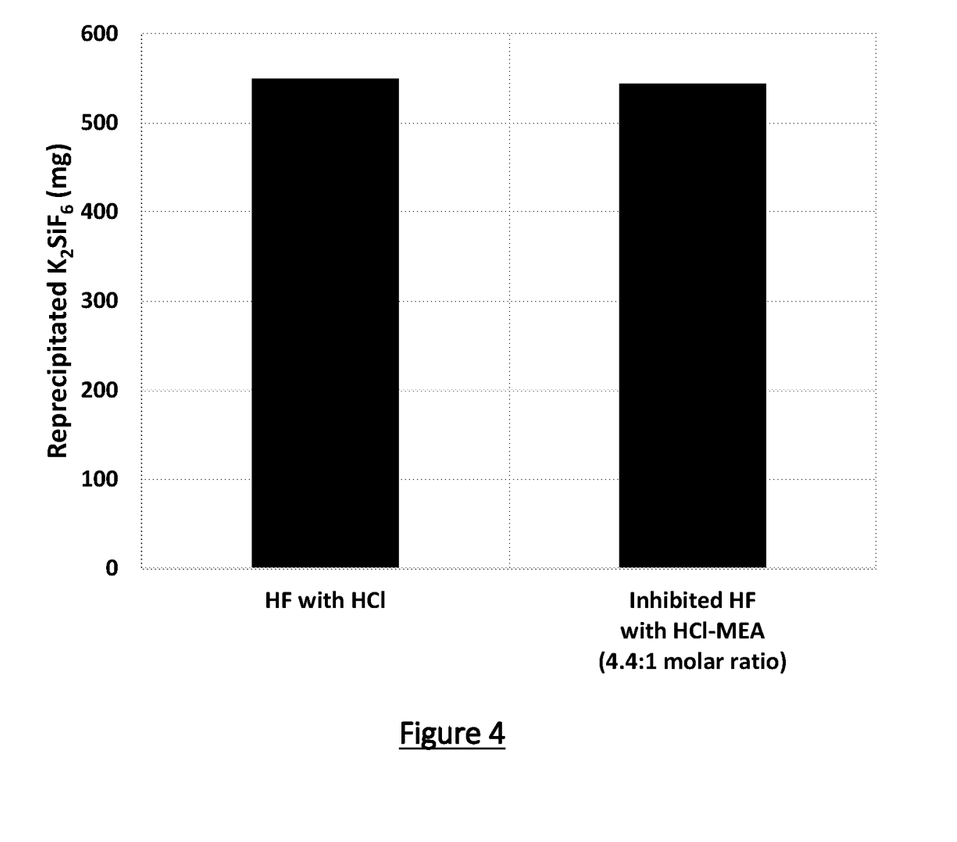
FIG. 4 is a graph showing reprecipitation of $K_2SiF_6$ in laboratory trials.

The precipitation will occur when the concentration exceeds 6.4 g/L for $Na_2SiF_6$, and 1.8 g/L for $K_2SiF_6$. Fluid's inhibited mud acid was not expected to prevent this precipitation, and laboratory trials demonstrate that similar amounts of potassium hexafluorosilicate were precipitated in comparison to a standard mud acid (FIG. 4).

Hexafluorosilicic acid can also react with the aluminum in clays to produce a silica gel precipitate as shown in equation 5 (unbalanced):

$$H_2SiF_6(aq) + ^{3+}(s)AlF_x^{(3-x)+}(aq) + SiO_2(s) + H^+(aq) \quad (5)$$

This reaction is reported to occur slowly at temperatures below 50° C., but rapidly at higher temperatures. When dissolving Kaolinite clay ($Al_2Si_2O_5[OH]_4$), laboratory tests found no difference in the amount of dissolved material when comparing a standard mud acid to an inhibited mud acid made with an acid composition comprising HCl:MEA in a ratio of 11.3:1 (FIG. 5), demonstrating that this invention is as effective as current systems while providing many storage, environmental and handling advantages.

The aluminum fluoride produced in equation 5 (also equation 3) can also precipitate above pH 2.5 to 3 if there is a high F/Al ratio, but the solubility of $AlF_3$ is relatively high at 56 g/L.

Tertiary precipitation products are those that occur as a result of a reaction of the aluminum fluorides produced in equations 3 and 5 continuing to react with clays to produce a silica gel precipitate as shown in equation 6 (unbalanced):

$$yAlF_x^{(3-x)+}(aq) + (x-y)Al—Si(s) + H^+(aq) \rightarrow xAlF_x^{(3-x)+}(aq) + (x-y)SiO_2(s) \quad (6)$$

Figure 5:
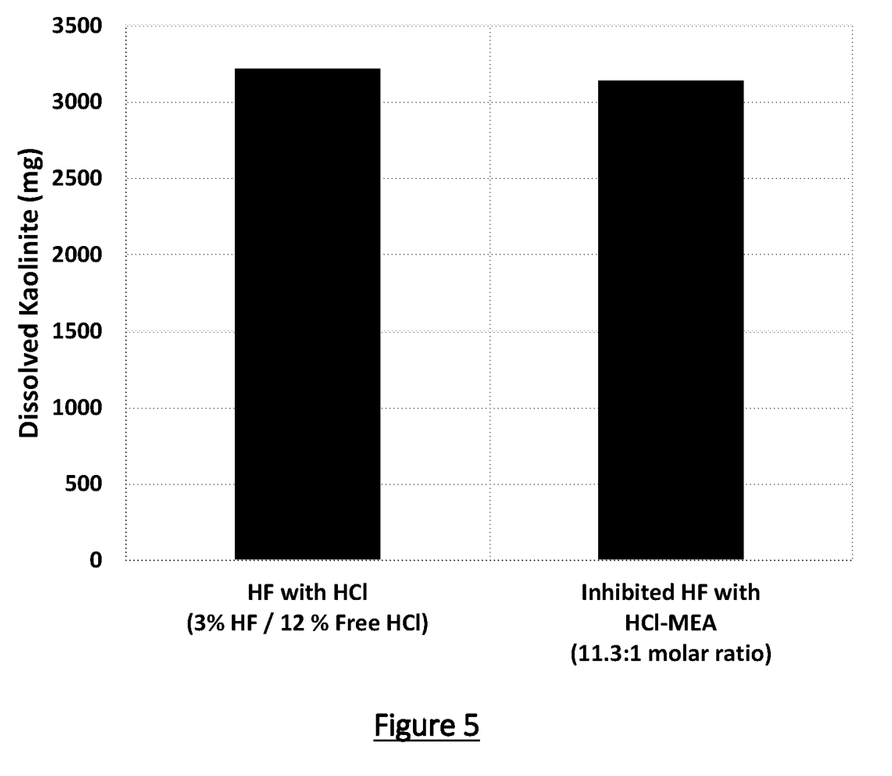
FIG. 5 is a graph showing the kaolinite Dissolving Ability of Standard Mud Acid versus Inhibited Mud Acid.

This tertiary reaction only occurs slowly at temperatures below 95° C., and is understood to produces essentially the same precipitates as the secondary reaction products in equation 5. Similar results to those obtained in FIG. 5 are expected, providing a linear performance between a standard mud acid and an inhibited HF mud acid.

Figure 6:
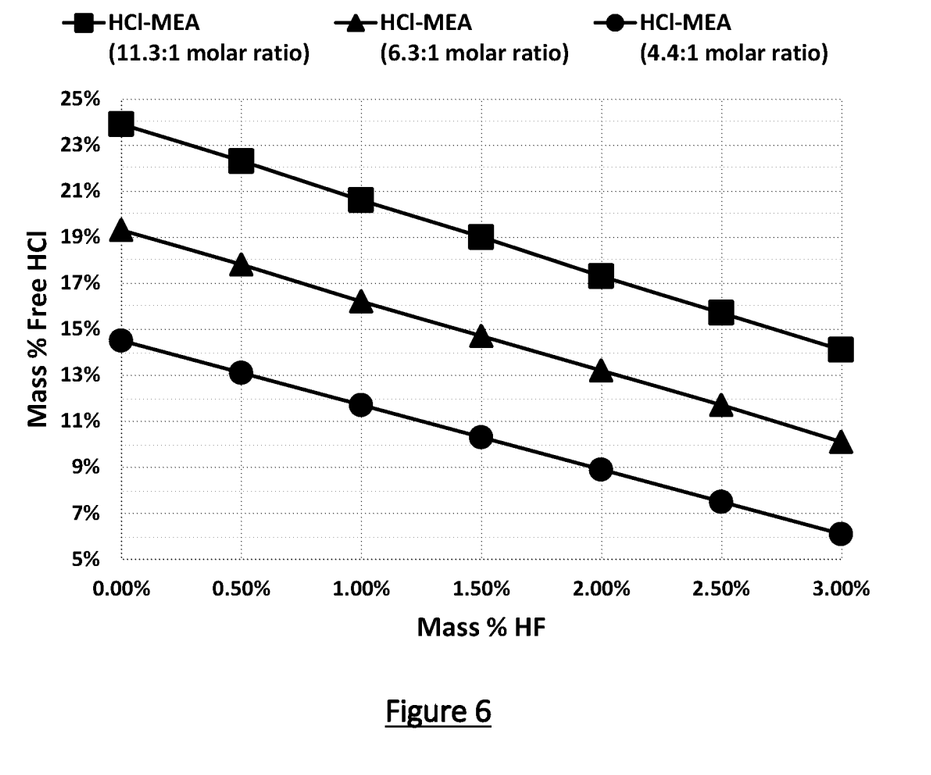
FIG. 6 is a graph showing the Maximum Possible % Free HCl in mud acids made with inhibited HF and MEA-HCl modified acid blends.

Mud Acid Ratio Limitations Using Acid Composition of HCl:MEA in Ratios of 4.4:1; 6.3:1; and 11.3:1 and Inhibited HF Mud acids typically contain HF at concentrations of 0.5 to 3% by mass, and HCl at 4 to 15% by mass. By using acids with an enhanced HSE profile, such as HCl:MEA (in a ratio of 4.4:1), rather than 15% HCl, the additional MEA inhibitor will limit the amount of free HCl available in solution. FIG. 6 shows the maximum amount of free HCl that would be available for mud acids made using inhibited HF and acid compositions comprising HCl:MEA in ratios of 4.4:1; 6.3:1; and 11.3:1.

According to another embodiment of the present invention, a few common high HCl:HF ratios, such as 12:3 and 10:2, are not possible using HCl:MEA (in a ratio of 4.4:1) and inhibited HF; to achieve these higher strength mud acids, HCl:MEA blends with lower HSE performance (where the HCl:MEA ratios are 6.3:1; and 11.3:1, for example) may be required.

According to a preferred embodiment of the present invention, the composition can be used in oil refining (as an acid catalyst in a standard oil refinery process). According to another preferred embodiment of the present invention, the composition can be used in the production of organofluorine compounds including: Teflon®, fluorocarbons, fluoropolymers and refrigerants like freon. According to yet another preferred embodiment of the present invention, the composition can be used in the production of fluoride compounds such as cryolite and aluminium trifluoride to name but a few examples. According to another preferred embodiment of the present invention, the composition, after activation, can be used as a pickling and cleaning agent in metalworking. It has a great ability to remove oxides and other impurities from carbon steels and stainless steel. According to yet another preferred embodiment of the present invention, the composition can be used, upon dilution and activation, as a household or industrial rust stain remover or aluminum or other appropriate metal brightener. According to yet another preferred embodiment of the present invention, the composition can be used, after activation, for etching glass.

Dermal Toxicity

HF is an acute dermal toxin, with an LD50 of between 401 and 802 mg/kg in rats. To determine the dermal toxicity of the composition of Example 1, a sample was sent to a 3$^{rd}$ party independent lab (STILLMEADOW, Inc.) to determine the acute dermal toxicity of the material. The study found that the acute dermal toxicity LD50 for a composition of MEA:HF in a molar ratio of 1.1:1 on albino rats was greater than 5,050 mg/kg (Study ID 22094-18), which is well above the 2,000 mg/kg limit for a material to be considered a potential acute dermal toxin.

The original animal was treated with 0.5 mL of undiluted test material, to permit predetermined observation times of treated sites for dermal irritation and defects. The first site dosed was washed and observed 3 minutes later. A second site was dosed and wrapped for 1 hour, then washed; both first and second test sites were observed. A third site dosed was wrapped for 4 hours. One hour after unwrapping and washing the third site, all three test sites were observed for signs of skin irritation and/or corrosion. Based on results of the first dosed animal, each of two additional animals were then dosed on a single intact 4-hour test site. Observations of all animals for dermal irritation and defects were made at ~1, 24, 48 and 72 hours, and (original animal only) 7, 10 and 14 days after the 4-hour dose unwrap.

Tissue destruction (indication of necrosis/ulceration) was not observed in any animals at any time during the study. The test material is considered non-corrosive by DOT criteria when applied to intact skin of albino rabbits.

Dermal irritation was observed in one animal for the primary skin irritation segment of the test. A Primary Irritation Index (PII) of 0.4 was obtained based on 1, 24, 48 and 72-hour observations (4-hour exposure site only) for irritation, and that value used to assign a descriptive rating of slightly irritating.

Corrosion Inhibitor Performance

The effectiveness of a proprietary corrosion inhibitor package on the acid composition of Example 1 was evaluated by activating it with a MEA-HCl modified acid, which already contains a corrosion inhibitor. The target mixture was 16.1 percent by mass the acid composition of Example 1 and 83.9 percent by mass MEA-HCl modified acid, which is equivalent to 3% free HF and 9.8% free HCl. The MEA-HCl modified acid blend contained the standard loading of 1% CI-5CNE (equivalent to 1% CI-5, 0.75% CI-1A, and 0.1% NE-1), and to replicate the anticipated field procedure, no additional CI was added. CI-1A refers to potassium iodide; CI-5 refers to a proprietary corrosion inhibitor package comprising a terpene; at least one amphoteric surfactant; and a solvent. NE refers to a common commercially available non-emulsifier.

The activated inhibited hydrofluoric acid was tested at 90° C. for 6 hours on coupons of several common oil field steels: 1018 carbon steel; J55; L80; and P110. The results are shown in Table 1.

TABLE 1

Corrosion Rates for the composition of Example 1 activated with MEA-HCl modified acid (9.8:3 Mud Acid Equivalent) at 90° C. for 6 Hours

| Metal | Corrosion Rate | |
|---|---|---|
| | mm/year | lb/ft$^2$. |
| 1018 | 13.426 | 0.015 |
| J55 | 16.036 | 0.018 |
| L80 | 13.274 | 0.015. |
| P110 | 12.764 | 0.014 |

The results show that favorable corrosion rates were obtained that are far below industry acceptable rates, with results between 0.014 and 0.018 lb/ft$^2$. The composition made in accordance with Example 1 corrosion results are slightly higher than corrosion rates that would typically be obtained with HCl:MEA (in a ratio of 4.4:1) of 0.005 to 0.010 lb/ft$^2$, but are still well below the typical industry acceptable value of 0.050 lb/ft$^2$.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. A method of preparing an inhibited hydrofluoric acid composition, the inhibited hydrofluoric acid composition consisting of an aqueous solution of hydrofluoric acid and one or more alkanolamines, the method comprising:
   adding one or more alkanolamines into a solution of hydrofluoric acid until the molar ratio of alkanolamine:hydrofluoric acid is at least 1.1:1,
   wherein the prepared inhibited hydrofluoric acid composition has a pH ranging from 11.15 to 12.

2. The method of claim 1, wherein the one or more alkanolamines is selected from the group consisting of monoethanolamine; diethanolamine; triethanolamine and combinations thereof.

3. The method of claim 1, wherein the one or more alkanolamines is monoethanolamine.

4. The method of claim 3, wherein the prepared inhibited hydrofluoric acid composition exhibits an acute dermal toxicity LD50 or greater than 5,050 mg/kg.

5. The method of claim 3, wherein the prepared inhibited hydrofluoric acid composition is non-corrosive to an intact skin after four hours of exposure to the intact skin.

6. The method of claim 3, wherein the prepared inhibited hydrofluoric acid composition exhibits a Primary Irritation Index (PII) of 0.4 after four hours of exposure to intact skin based on 1 hour, 24 hour, 48, hour and 72 hour observations of the exposed intact skin.

7. The method of claim 1, wherein the one or more alkanolamines is diethanolamine.

8. The method of claim 1, wherein the one or more alkanolamines is triethanolamine.

9. The method of claim 1, wherein the solution of hydrofluoric acid consists of hydrogen fluoride and water.

* * * * *